Inventor
GERALD OLIVER STEVENSON
BY: Francis E. Boyce
ATTORNEY

Jan. 12, 1943. G. O. STEVENSON 2,307,967
CALCULATOR RESPECTING WATER STREAMS USED
FOR FIRE FIGHTING OR OTHER PURPOSES
Filed May 29, 1942 2 Sheets-Sheet 2
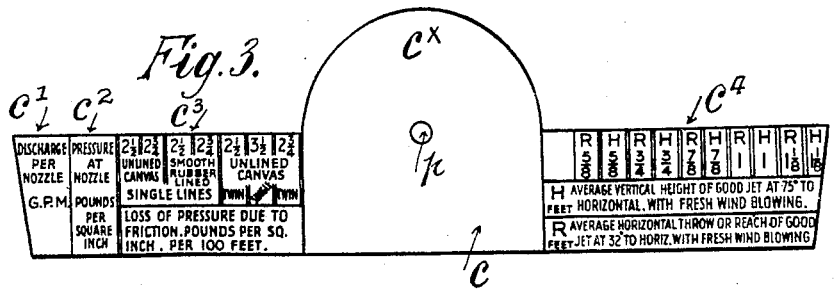
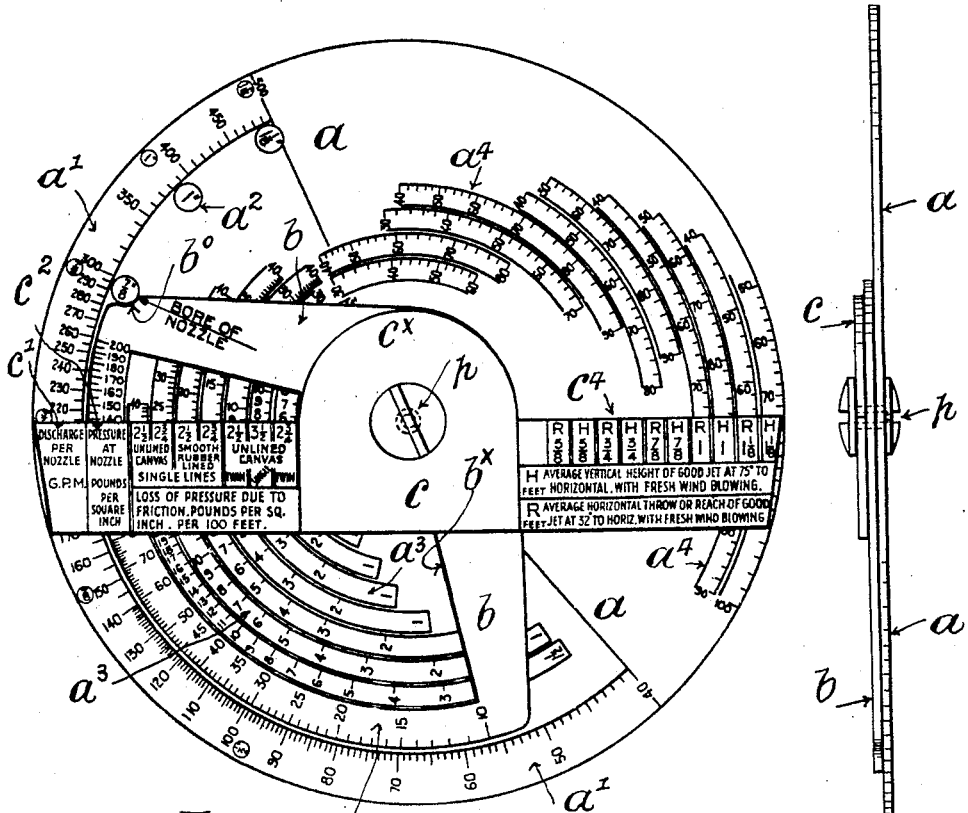
Inventor
GERALD OLIVER STEVENSON
BY: Francis E. Boyer
ATTORNEY Patented Jan. 12, 1943

2,307,967

UNITED STATES PATENT OFFICE 2,307,967

CALCULATOR RESPECTING WATER STREAMS USED FOR FIRE FIGHTING OR OTHER PURPOSES

Gerald Oliver Stevenson, Cheadle, England, assignor of one-half to John Morris & Sons Limited, Manchester, England, a British company Application May 29, 1942, Serial No. 444,963
In Great Britain May 22, 1941

2 Claims. (Cl. 235—88)

This invention relates to a calculating device or circular scale with relatively movable elements by which calculations can be manipulatively made with respect to water discharge, effective height, distance, friction engendered, and other data, using nozzles attached to hose for fire-fighting or other purposes, and whereby on setting of the calculating device the results can be seen at a glance.

The calculating device or circular scale with its relatively movable elements and graduations or scales marked thereon is hereafter described and illustrated by the accompanying drawings, wherein—

Fig. 3 shows a separate view of the angularly movable scale-like rule or transverse scale.

Fig. 4 is a front view of the calculator with the two elements, i. e., the graduated segmental structure and the angularly movable scale-like rule or transverse scale pivoted upon the graduated base-board or disc ready to be set to make the desired calculation.

Fig. 5 is an edge view showing the three relatively movable elements and pivot of the calculator.

Figure 1:
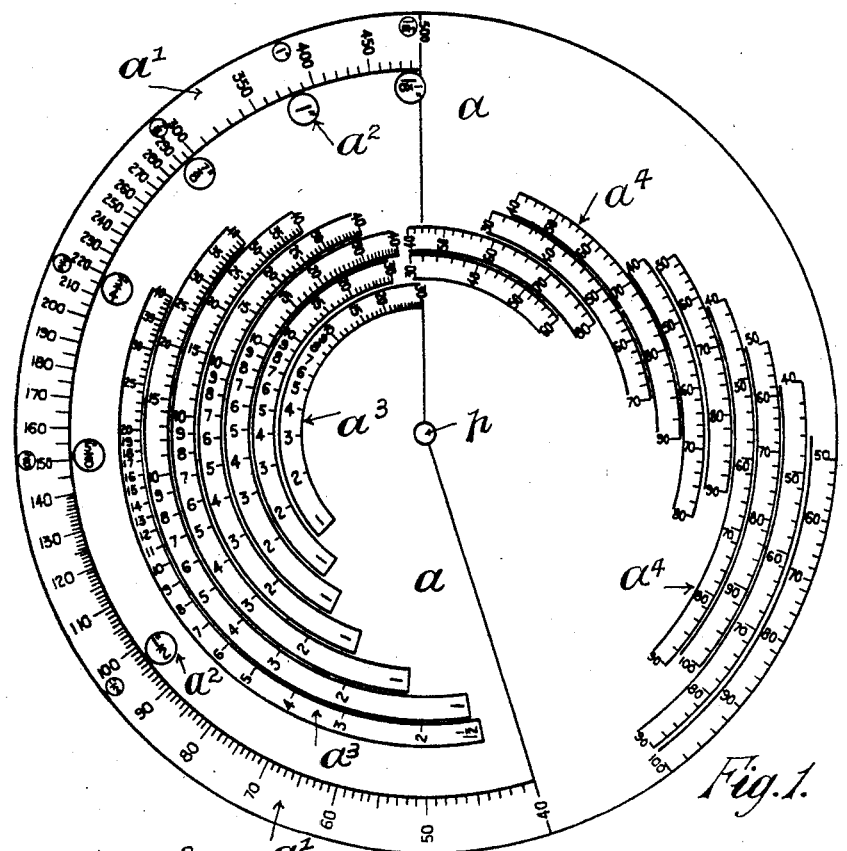
Fig. 1 is a separate face view of the base-board or disc with its graduations or scales.
Figure 2:
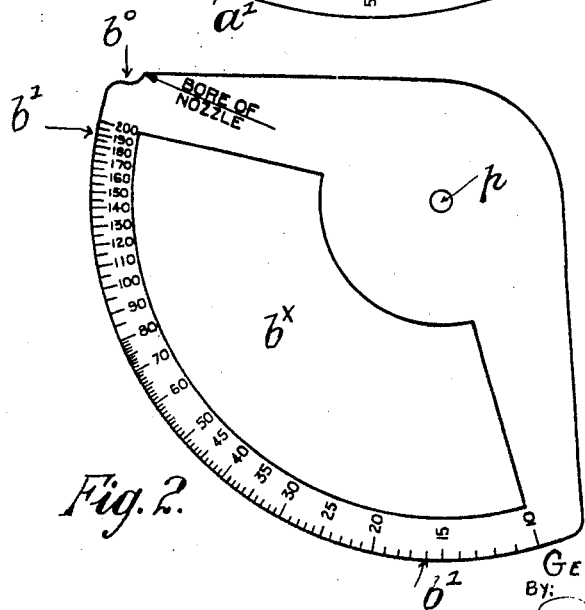
Fig. 2 is a separate face view of the segmental structure with its graduations.

The calculating device or complete circular scale comprises a base-board in the form of a base disc $a$, and this is graduated on the left-hand over somewhat more than half the area for quantity in gallons per minute, and the graduations $a^1$ run from 40 to 500, same having a curved disposition adjacent the perimeter of the disc $a$ as illustrated. Adjacent such graduations are spaced circle-like markings $a^2$ corresponding to the bore of several nozzles of varying diameter, for example ½" to 1⅛". Concentric with the aforesaid graduations as to gallons per minute and bore of nozzles, are other segmental scales which have to do with the calculating of friction losses, and of such there are shown seven segmental scales $a^3$ properly graduated to deal with the type and diameter of hose.

On the other or right-hand of the base disc $a$ there are other concentric graduations or scales $a^4$ which afford the information respecting reach and height of a jet.

Co-operating with the base disc $a$ and superposed thereon and movable around a centre pin $p$, is a segmental structure $b$ cut-away at $b^x$ so as not to obscure the scales $a^3$ for friction losses, and the narrow curved segmental portion thereof is graduated at $b^1$ as to nozzle pressure, for example from 10 to 200.

At the leading edge of the segmental structure $b$ is a curved portion $b^0$ to register with any indicated bore or nozzle shown on the base disc $a$, viz., ½" to 1⅛", and the graduations $b^1$ on this particular scale serve to indicate pressure at nozzle in pounds per square inch.

Combining with the base disc $a$ and the segmental structure $b$ is an angularly movable scale-like rule or transverse scale $c$ marked on either hand, the same having a central lobe $c^x$ and being independently movable about the centre pin $p$. The angularly movable scale-like rule or transverse scale $c$ is the link connecting height and/or reach with pressure and/or quantity. At the left-hand end said angularly movable scale-like rule or transverse scale $c$ as to its tip or straight edge $c^1$ works over the scale $a^1$ of the base disc $a$ indicating gallons per minute. The next succeeding section $c^2$ of the angularly movable scale-like rule or transverse scale $c$ works over the scale $b^1$ of the segmental structure $b$ to indicate pressure at nozzle in pounds per square inch. Inwards therefrom, said rule $c$ is marked or divided at $c^3$ as to types of hose, for example unlined canvas hose 2½" and 2¾" diameter, smooth rubber lined hose of the same diameters, then unlined hose twin 2½" diameter, single 3½" diameter, twin 2¾" diameter, the marks or graduations being movable on movement of the angularly movable scale-like rule or transverse scale $c$ over and with respect to the seven sets of curved graduations or scales $a^3$ on the base disc $a$, and which, on angular movement of $c$, indicate friction losses corresponding to size and type of hose in pounds per square inch per 100 feet.

The right-hand portion of the angularly movable scale-like rule or transverse scale $c$ is marked out at $c^4$ in alternate sections for "reach" and "height" of jet, rising for example by ⅛" from ⅝" to 1⅛", the ten alternate sections working over the 10 sets of graduations or scales $a^4$ on the base disc $a$, and which deal with "reach" and "height."

The graduations or scales are worked out mathematically and properly marked upon the combined elements, same being based on Freeman's careful experiments and figures.

The compilation and setting out of the graduations or scales and markings could vary somewhat with the desired range of the calculator, but the description given is of a generally useful calculator and suited for ordinary requirements.

The firestream calculator above described and illustrated when manipulated will give the following information:

1. Gallons per minute discharged between 40 and 500 g. p. m. from smooth coned fire nozzles in sizes from ½" to 1⅛", that is, all normal sizes in general use.

2. Pressure at the nozzle in pounds per square inch between 10 and 200, and which is usually measured at actual emerging jet by an instrument.

3. Loss of pressure due to friction in pounds per square inch per 100 foot run, in seven different layouts or sets of working conditions: 2½", 2¾" and 3½" (single line) unlined canvas hose; 2½" and 2¾" best quality smooth rubber lined hose; parallel or twin lines of either 2½" or 2¾" unlined canvas hose.

The calculator shows at a glance the relative carrying capacities of the various sizes, and the saving that can be effected in pressure by employing two lines of hose laid in parallel when feeding large nozzles.

4. Total pump delivery pressure in pounds per square inch required at the pump for any size of nozzle and length of hose layout. This is obtained by the addition of the nozzle pressure and the frictional loss of pressure. If the nozzle is elevated above the pump an additional approximate allowance of 5 lbs. per square inch should be made for each 10 feet of such elevation.

5. Vertical effective height in feet of a good firestream inclined at an angle of 75 degrees to the horizontal.

6. Horizontal effective reach or throw in feet of a good firestream inclined at an angle of 32 degrees to the horizontal.

The figures given for height and reach are average values for good effective jets with a fresh wind blowing, not the extreme distance reached by the farthermost drops of a jet in calm air, figures often quoted, and of little practical value, the figures given or obtained being based on Freeman's known careful experiments and under normal weather conditions and will give the minimum values to be expected.

To make use of the calculator described:

(1) Set the arrow adjacent the curved portion $b^0$ in the angularly movable segmental structure $b$ (which gives nozzle pressure) to the size of nozzle $a^2$ to be used, and it is then left in that position for all readings for that size of nozzle.

(2) Set the uppermost angularly movable scale-like rule or transverse scale $c$ to a given nozzle pressure on the graduations $b^1$ when the g. p. m. discharged can be read off on the outermost concentric graduations or scale $a^1$ visible on the base disc $a$. Friction loss in fire hose of various sizes can then be read off on the concentric graduations or scales $a^3$, visible on the left-hand side through the cut-away gap $b^x$ in the angularly movable segmental structure $b$. The effective reach and height of the jet at the pressure to which the angularly movable scale-like rule or transverse scale $c$ is set are given on the concentric scales $a^4$ on the right-hand side of the base disc $a$ and under the nozzle size on the right-hand side of the aforesaid scale $c$.

There are now given several examples of working and results obtainable using the calculator described.

*Example 1*

What is the discharge from two 1" nozzles, each with a pressure of 80 lbs. per square inch at the nozzle, and the total pressure required at the pump, if each nozzle is fed through 100 feet of 2¾" unlined canvas hose laid on level ground.

Set the angularly movable segmental scale $b$ to 1" nozzle $a^2$ and the angularly movable scale-like rule on transverse scale $c$ to a pressure of 80 lbs. per square inch. Read the g. p. m. discharged as 213 g. p. m. and the loss in 100 feet of 2¾" unlined hose as 22½ lbs. The effective height of the jet is given on the scale $a^4$ at the right-hand, by the position of the markings at $c^4$ on the aforesaid scale $c$ as 89 feet and the reach as 76 feet. The total pump pressure required is therefore 102½ lbs. per square inch at a delivery of 426 g. p. m.

*Example 2*

Two 1" jets are required each to deliver 200 g. p. m. at a distance of 400 feet from the pump on level ground, 2½" unlined canvas hose is available. What is the total pump pressure required, and the effective height of the jets?

Set the angularly movable segmental scale $b$ to 1" nozzle, and the angularly movable graduated scale-like rule or transverse scale $c$ to 200 g. p. m. on the outer quantity scale $a^1$. Read off nozzle pressure as 71 lbs. and the friction loss in 400 feet of 2½" unlined hose as 4 times 31½=126 lbs. per square inch, which is excessive. Parallel lines of the same size hose would therefore be used with dividing and collecting breechings. The loss in a 400 ft. line in parallel (each carrying 100 g. p. m.) is 4 times 7¾=31 lbs., in addition an allowance of say 8 lbs. should be made to cover losses in a short length of single hose from collecting breeching to nozzle together with losses in breechings themselves. Total pump pressure is therefore 71+31+8=110 lbs. per square inch at a delivery of 400 g. p. m. The effective height is 85 feet.

*Example 3*

Required to provide two jets 85 feet high at a distance of 200 feet from pump, using 2¾" unlined canvas hose laid on level ground.

From examination of the scales of effective height, it will be seen that a ¾" jet is the smallest size suitable. Set the angularly movable segmental scale $b$ to a ¾" nozzle, and the angularly movable scale-like rule or transverse scale $c$ to 85 feet height on the scale for that size of nozzle. The nozzle pressure required can then be read off as 105 lbs. per square inch, and the quantity discharged as 138 g. p. m. The friction loss in 200 feet of 2¾" unlined canvas hose is twice 9½=19 lbs., and the total pump delivery pressure required is 124 pounds per square inch, and the quantity 276 g. p. m.

*Example 4*

It is required to relay water by means of trailer pumps each having a capacity of 400 g. p. m. at a delivery pressure of 130 lbs. per square inch, and using 2¾" unlined canvas hose in 75 feet lengths, one line of hose from each of the two pump outlets. How far can the pumps be placed apart on level ground?

This does not involve the use of the angularly movable segmental scale, but only the angularly movable scale-like rule or tranverse scale $c$. Set the same to 200 g. p. m. on the left-hand outer scale $a^1$ and read off the friction loss as to 2¾" unlined hose as 20 lbs. to the square inch per 100 feet. With 600 feet of hose in use on each outlet, i. e., 8 standard home office lengths of 75 feet, the loss due to friction will be 120 lbs., the readings being per 100 feet, and the water would be delivered into the suction branch of the second pump, or into the canvas dam, at a pressure of 10 lbs., per square inch.

All three scales do not require to be used together for certain calculations, i. e., for friction in hose, base disc $a$ and angularly movable scale-like rule or transverse scale $c$ are used; for height and/or reach and quantity the aforesaid scale $c$ and base disc $a$ are used; for quantity and pressure, the base disc $a$ and segmental structure $b$ are used.

The calculator can be made from cardboard or more substantial material, and consists of but three graduated elements, $a$, $b$, $c$ (two, $b$ and $c$, of particular design), and a centre pin, and the graduations can be most legibly displayed using a base disc of some 7½ inches diameter, and the examples can be printed on the back of the base disc, and other information on a casing adapted to house the calculator.

I declare that what I claim is:

1. A calculating device comprising relatively movable graduated or scale elements including a base disc with graduations on the left-hand side thereof to indicate quantity of water in gallons per minute discharged by nozzles, markings for bore of nozzles and scales as to friction losses, and on the right-hand of such base disc scales as to "reach" and "height" of jet, a pivotal segmental structure which is partly cut-away and graduated to indicate pressure at nozzle and having a shaped portion as to the forward edge, and a pivoted angularly movable transverse rule or scale-like device with edge working over the graduations for gallons per minute discharge by nozzle and a section working over the scales for pressure at nozzle in pounds per square inch, and inwards therefrom on the left-hand, divisions as to type and size of hose and movable over the scales on the base disc indicating friction losses, the aforesaid transverse rule or scale-like device being marked on the right-hand in alternate sections for "reach" and "height" which work over the scales on the right-hand of the base disc which deal with "reach" and "height."

2. A calculating device comprising a base element with graduations thereon to indicate gallons discharged per minute by nozzles, markings thereon denoting bore of nozzles, scales for reading friction losses, and on the right-hand of the base element scales for reading "reach" and "height" of jet, an angularly movable segmental structure cut-away to expose the friction loss scales, pivoted to the base element and graduated to indicate pressure at nozzle, and a transverse rule or scale-like device having sections, which sections work with respect to the graduations or scales on the base element.

GERALD OLIVER STEVENSON.